United States Patent [19]

van Konyenburg et al.

[11] Patent Number: 5,025,131

[45] Date of Patent: Jun. 18, 1991

[54] METHOD OF HEATING DIESEL FUEL UTILIZING CONDUCTIVE POLYMER HEATING ELEMENTS

[75] Inventors: Peter H. van Konyenburg, Palo Alto; Andrew Au, Fremont, both of Calif.

[73] Assignee: Raychem Corporation, Menlo Park, Calif.

[21] Appl. No.: 461,199

[22] Filed: Jan. 5, 1990

Related U.S. Application Data

[60] Division of Ser. No. 423,589, Sep. 27, 1982, Pat. No. 4,935,156, which is a continuation-in-part of Ser. No. 300,709, Sep. 9, 1981, abandoned.

[51] Int. Cl.[5] .................. H01G 9/04

[52] U.S. Cl. .................. 392/451; 219/205; 219/206; 219/505; 219/548; 219/549; 219/552; 210/184; 210/186; 123/549; 123/557; 338/22 R; 338/212; 338/214

[58] Field of Search .................. 219/205-206, 219/306-307, 505, 548, 549, 552; 210/184, 186; 123/549, 557; 338/22 R, 212, 214

[56] References Cited

U.S. PATENT DOCUMENTS

| | | | |
|---|---|---|---|
| 3,823,217 | 7/1974 | Kampe | 264/105 |
| 3,935,159 | 1/1976 | Demillecamps et al. | 260/42.27 |
| 3,962,373 | 6/1976 | Petreucelli | 260/900 |
| 4,237,441 | 12/1980 | van Konynenburg et al. | 338/22 R |
| 4,251,432 | 2/1981 | Martin | 260/42.14 |
| 4,304,987 | 12/1981 | van Konynenburg | 219/553 |
| 4,328,151 | 5/1982 | Robinson | 523/205 |

FOREIGN PATENT DOCUMENTS

| | | |
|---|---|---|
| 1805906 | 6/1969 | Fed. Rep. of Germany . |
| 2443123 | 11/1979 | France . |
| 1373711 | 11/1974 | United Kingdom . |
| 1449261 | 9/1976 | United Kingdom . |
| 1469311 | 4/1977 | United Kingdom . |
| 1469312 | 4/1977 | United Kingdom . |
| 2075992A | 11/1981 | United Kingdom . |

*Primary Examiner*—Bruce A. Reynolds
*Assistant Examiner*—John A. Jeffery
*Attorney, Agent, or Firm*—Timothy H. P. Richardson; Marguerite E. Gerstner; Herbert G. Burkard

[57] ABSTRACT

Conductive polymer compositions based on polyvinylidene fluoride have improved properties when the polyvinylidene fluoride has a very regular structure which can be characterized by a low head-to-head content in the repeating units. The improved properties include electrical stability when contacted by organic fluids and/or when maintained at elevated temperatures in air. Such compositions which exhibit PTC behavior are particularly useful in the form of self-limiting heaters which are immersed in organic fluids, especially flexible strip heaters for heating diesel fuel before it passes through a fuel filter.

14 Claims, 2 Drawing Sheets

METHOD OF HEATING DIESEL FUEL UTILIZING CONDUCTIVE POLYMER HEATING ELEMENTS

CROSS-REFERENCE TO RELATED APPLICATION

This application is a divisional application of our copending, commonly assigned application Ser. No. 06/423,589, filed Sept. 27, 1982, now U.S. Pat. No. 4,935,156, which is a continuation-in-part of our commonly assigned application Ser. No. 300,709 filed Sept. 9, 1981, now abandoned. The entire disclosure ofe ach of these applications is incorporated herein by reference.

BACKGROUND OF THE INVENTION

1. Field of the Invention

This invention relates to conductive polymer PTC compositions and devices comprising them.

2. Introduction of the Invention

Conductive polymer compositions, and devices comprising them, are known. Reference may be made for example to U.S. Pat. Nos. 2,978,665, 3,243,753, 3,351,882, 3,571,777, 3,793,716, 3,823,217, 3,861,029, 4,017,715, 4,177,376, 4,188,276, 4,237,441, 4,238,812, 4,242,573, 4,246,468, 4,255,698 and 4,388,607, 4,426,339, 4,538,889, and 4,560,498; U.K. Patent No. 1,534,715; the article entitled "Investigations of Current INterruption by Metal-filled Epoxy Resin" by Littlewood and Briggs in J. Phys D: Appl. Phys, Vol. II, pages 1457–1462; the article entitled "The PTC Resistor" by R. F. Blaha in Proceedings of the Electronic Components Conference, 1971; the report entitled "Solid State Bistable Power Switch Study" by H. Shulman and John Bartho (August 1968) under Contract NAS-12- 647, published by the National Aeronautics and Space Administration; J. Applied Polymer Science 19, 813–814 (1975), Klason and Kubat; Polymer Engineering and Science 18, 649–653 (1978) Narkis et al; and commonly assigned U.S. Ser. Nos. 601,424 (Moyer), now abandoned, published as German OLS 2,634,999. For details of more recent developments in this field, reference may be made to copending and commonly assigned U.S. Ser. Nos. 67,207 (Doljack et al.), now abandoned in favor of a continuation-in-part application Ser. No. 228,347, now U.S. Pat. No. 4,450,496, 98,711 (Middleman et al.), now U.S. Pat. No. 4,315,237, 141,984 (Gotcher et al.), now U.S. Pat. No. 4,413,301 141,988 (Foutes et al.), now abandoned 141,989 (Evans), 141,991 (Fouts et al.), now U.S. Pat. No. 4,545,926, 142,053 (Middleman et al.), now U.S. Pat. No. 4,352,083, 142,054 (Middleman et al.), now U.S. Pat. No. 4,317,027, 150,909 (Sopory), now abandoned 150,910 now U.S. Pat. No. 4,334,351, (Sopory), 150,911 now U.S. Pat. No. 4,318,881, (Copory), 174,136 (Cardinal et al.), now U.S. Pat. No. 4,314,230, 176,300 (Jensen), now U.s. Pat. No. 4,330,704, 184,647 (Lutz), now abandoned, 250,491 (Jacobs et al.), now abandoned, 254,352 (Taylor), now U.S. Pat. No. 4,426,633, 272,854 (Stewart et al.) now abandoned in favor of a continuation-in-part application Ser. No. 403,203, now U.S. Pat. No. 4,502,929, 273,525 (Walty) now U.S. Pat. No. 4,398,084, and 274,010 (Walty et al.) now abandoned. The disclosure of each of the patents, publications and applications referred to above is incorporated herein by reference.

Electrical devices containing conductive polymers generally (though not invariably) comprise an outer jacket, usually of insulating material, to protect the conductive polymer from damage by the surrounding environment. However, if no protective jacket is used, or if the jacket is permeable to harmful species in the environment, or if the conditions of use are such that the jacket may become damaged, it is necessary or desirable to select a conductive polymer which is not damaged (or which deteriorates at an acceptably low rate) when exposed to the surrounding environment. Exposure of conductive polymers to organic fluids generally results in an increase in resistivity; exposure to air, especially at elevated temperatures between room temperature and 35° C. below the melting point generally results in a decrease in resistivity both at the elevated temperature and at room temperature (a phenomenon known in the art as "resistance relaxation").

SUMMARY OF THE INVENTION

We have discovered that conductive polymer compositions which are based on polyvinylidene fluoride exhibit substantially improved stability if the polyvinylidene fluoride has a very regular structure which can be characterized by a low head-to-head content in the repeating units. Polyvinylidene fluoride is made up of repeating units of formula —$CH_2CF_2$—, which can be arrangd head-to-tail (i.e. —$CH_2CF_2$—$CH_2CF_2$—) or head-to-head (i.e. —$CH_2CF_2$—$CF_2CH_2$—), and we have found that the lower the head-to-head content, the greater the stability of the resistivity of the composition when exposed to organic fluids and/or when exposed to air at elevated temperature. Previously known conductive polymer compositions based on polyvinylidene fluoride have made use of polyvinylidene fluoride of relatively high head-to-head content, namely at least 5.2% and generally higher, which are easier to process than the polymers used in the present invention.

In its first aspect, the present invention provides a conductive polymer composition which comprises (a) polyvinylidene fluoride having a head-to-head content of less than 5.0%, preferably less than 4.5%, particularly less than 4.0%, and (b) a particulate conductive filler, especially carbon black, dispersed in the polyvinylidene fluoride. The composition preferably exhibits PTC behavior.

In its second aspect, the invention provides an electrical device which comprises a conductive polymer element composed of a conductive polymer composition as defined above and at least one electrode in electrical contact with said element, for example, at least two electrodes which can be connected to a source of electrical power and which when so connected cause current to flow through the conductive polymer element.

In its third aspect, the invention provides a fuel feedthrough and heating assembly which can be positioned and connected between a fuel filter and a fuel tank of a fuel supply system to provide means for heating fuel which is being pumped through a fuel line from the fuel tank to the fuel filter, said feedthrough and heating assembly being characterized by comprising (A) a feedthrough comprising (i) a fuel conduit having at one end thereof a fuel line connector for connecting the feedthrough to a fuel line and at the other end thereof a fuel filter connector for connecting the feedthrough to a fuel filter; and (ii) a neck portion which protrudes from the fuel conduit between the ends thereof and which comprises a chamber;

(B) a flexible self-limiting strip heater as defined above which preferably comprises a fuel-resistant insulating jacket, one end of the strip heater being within the chamber of the neck portion, and the strip heater passing through the fuel line connector and protruding from the fuel conduit;

(C) insulated electrical leads connected to the electrodes of the heater, the connections lying within the chamber of the neck portion;

(D) a fuel-resistant, water-resistant and insulating composition which encapsulates (i) the connections between the electrodes and the leads, (ii) the insulation at the ends of the connected electrical leads and (iii) the insulating jacket at the end of the connected heater; and (E) a fuel-resistant gasket which prevents fuel which is beign pumped through the fuel conduit from exiting through the neck portion.

BRIEF DESCRIPTION OF THE DRAWING

The invention is illustrated in the accompanying drawing, in which.

DETAILED DESCRIPTION OF THE INVENTION

Figure 1:
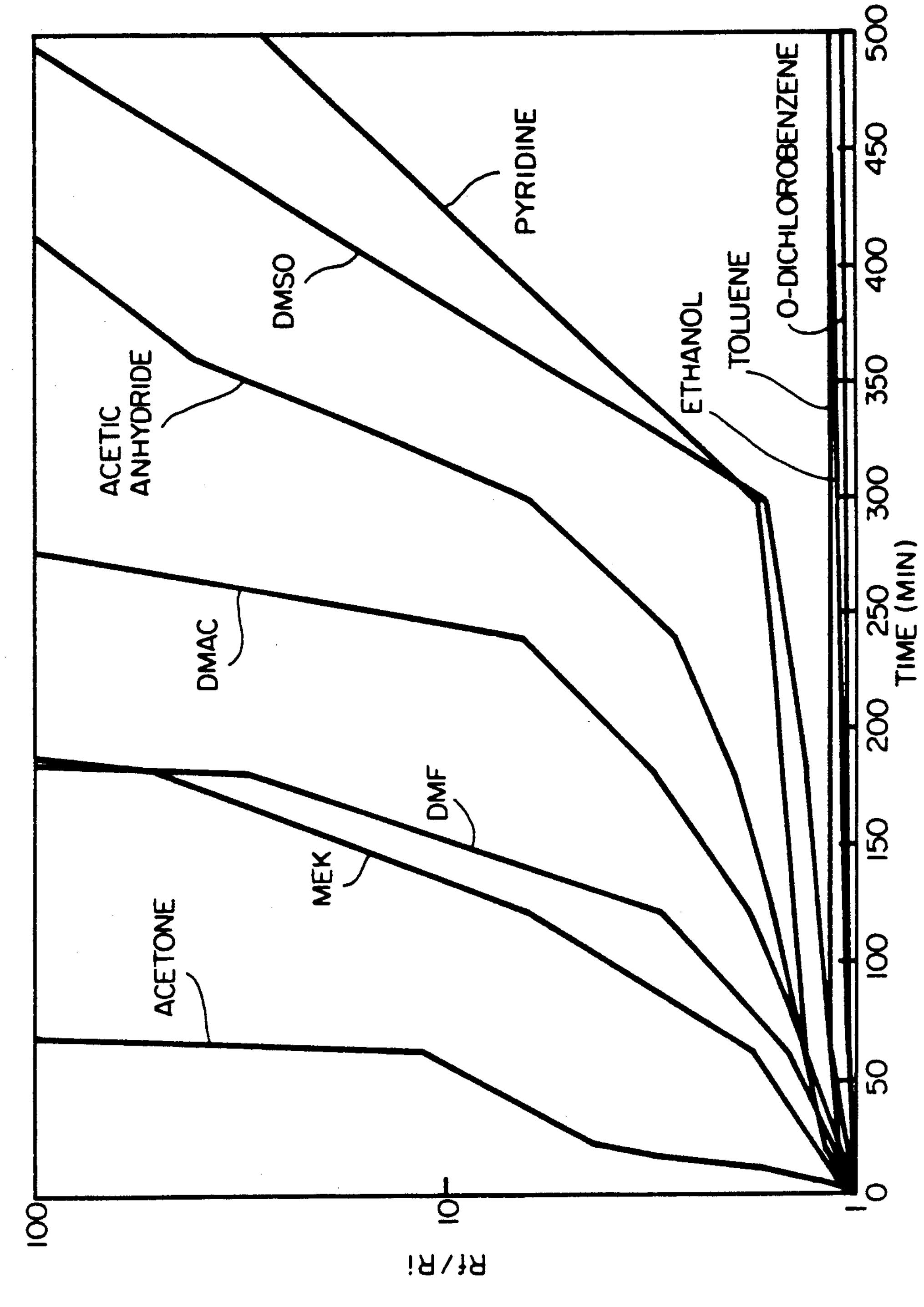
FIGS. 1 and 2 show the effect on resistivity of immersing two conductive polymer compositions in various organic solvents.

Polyvinylidene fluorides suitable for use in this invention are commercially available. The head-to-head content of a polyvinylidene fluoride can be measured by those skilled in the art. We have found that the measured head-to-head contents of different samples of a polymer sold under a particular trade name can differ substantially. In general, the presently available polyvinylidene fluorides made by suspension polymerization (rather than emulsion polymerization) have lower head-to-head contents. The number average molecular weight of the polymer is generally at least 5,000 e.g. 7,000 to 15,000.

The polyvinylidene fluoride is preferably a homopolymer of vinylidene fluoride, but the presence of small quatnities of comonomers, (preferably less than 15%, particularly less than 5% by weight), e.g. tetrafluoroethylene, hexafluoropropylene and ethylene, is not excluded. The polyvinylidene fluoride is preferably the sole crystalline polymer in the composition, but other crystalline polymers, e.g. other crystalline fluoropolymers, may also be present. The composition may contain relatively small amounts (preferably less than 35%, especially less than 20%, particularly less than 10%, by volume) of one or more elastomeric polymers, particularly solvent-resistant fluorine-containing elastomers and acrylic elastomers, which are usually added primarily to improve the flexiblity and elongation of the composition.

The particulate conductive filler preferably comprises carbon black, and often consists essentially of carbon black. Choice of the carbon black will influence the resistivity/temperature characteristics of the composition. Compositions exhibiting PTC behavior are preferred for many devices of the invention, especially self-limiting heaters, and for these a carbon black having a ratio of surface area ($m^2/g$) to particle size (mu) of 0.03 to 6.0 or NTC behavior may be preferred. The amount of conductive filler used will depend upon the desired resistivity of the composition. For flexible strip heaters which are to be used for heating diesel fuel and powered by a 12 volt battery, we prefer a PTC composition whose resistivity at 25° C. is less than 200 ohm.cm e.g. about 10 to about 100 ohm.cm. In such compositions the amount of carbon black may for example be 16 to 25% by weight.

In addition to one or more conductive fillers, the compositions may also comprise other conventional additives, such as non-conductive fillers (including flame retardants), antioxidants and crosslinking agents (or residues thereof if the composition has been crosslinked).

The compositions of the invention are preferably cross-linked (particularly by irradiation), since this has been found to enhance their resistance to organic solvents.

Preparation of the compositions of the invention can be carried out in conventional fashion. Often it will be convenient to melt-extrude the composition directly into a water bath (which may be heated), and using this technique subsequent annealing is often not required.

The invention is illustrated by the following Examples, in which Examples 1, 2, 3, 7, 12 and 13 are Comparative Examples not in accordance with the invention.

EXAMPLE 1

The ingredients listed for Composition A in Table 1 below were mixed in a Banbury mixer. The mixture was dumped, placed on a steam-heated mill and extruded into a water bath through a 3.5 inch (8.9 cm) extruder fitted with a pelletizing die. The extrudate was chopped ino pellets which were dried for 16 hours at 80° C.

The ingredients listed for Composition B in Table 1 were mixed and pelletized in the same way as for Composition A.

83% by weight of the Composition A pellets and 17% by weight of the Composition B pellets were tumble blended and dried at 110° C. The composition of the resulting Final Blend is shown in Table 1. Using a 1.5 inch (3.8 cm) diameter extruder fitted with a crosshead die having an orifice 0.4 inch (1.0 cm)×0.1 inch (0.3 cm), the blend was melt-extruded over a pair of preheated 14 AWG (1.85 mm diameter) 19/27 nickel-coated copper wires with a center-to-center separation of 0.25 inch (0.64 cm). The extrudate was passed immediately through a bath of water at room temperature, air-dried, and then irradiated to a dosage of 10 Mrad. The conductive polymer had a resistivity of about 50 ohm.cm at 25° C.

TABLE 1

| | Composition B | | | Composition A | | | Final Blend | |
|---|---|---|---|---|---|---|---|---|
| | Wt (g) | Wt % | Vol % | Wt (g) | Wt % | Vol % | Wt % | Vol % |
| Kynar 460 | 16,798 | 72 | 72.6 | 16,339 | 70 | 70.6 | 71.7 | 72.3 |
| Furnex N765 | 4,433 | 19 | 18.7 | 4,901 | 21 | 20.7 | 19.3 | 19.0 |
| Viton AHV | 1,400 | 6 | 5.9 | 1,400 | 6 | 5.9 | 6.0 | 5.9 |
| Omya-BSH | 467 | 2 | 1.3 | 467 | 2 | 1.3 | 2.0 | 1.3 |

TABLE 1-continued

| | Composition B | | | Composition A | | | Final Blend | |
|---|---|---|---|---|---|---|---|---|
| | Wt (g) | Wt % | Vol % | Wt (g) | Wt % | Vol % | Wt % | Vol % |
| TAIC | 233 | 1 | 1.5 | 233 | 1 | 1.5 | 1.0 | 1.5 |

Kynar 460 is polyvinylidene fluoride available from Pennwalt and having a head-to-head content of about 5.5%.
Furnex N765 is a carbon black available from Columbian Chemical having a particle size of about 60 millimicrons, a surface area of about 32 $m^2/g$ and a DBP value of about 112 $cm^3/100$ g.
Viton AHV is a copolymer of hexafluoropropylene and polyvinylidene fluoride manufactured by du Pont.
Omya-BSH is calcium carbonate available from Omya Inc.
TAIC is triallyl isocyanurate, a radiation cross-linking agent.

EXAMPLES 2-6

The ingredients listed for Examples 2 to 6 in Table 2 below were mixed in a Banbury mixer. The mixture was dumped, granulated and dried for 72 hours at 75° C. under vacuum. Using a b 0.75 inch (1.9 cm) single screw extruder fitted with a cross-head die having an orifice 0.3 inch (0.76 cm)×0.1 inch (0.3 cm), the blend was melt-extruded over a pair of pre-heated 18 AWG (1.2 mm diameter) 19/27 nickel-coated copper wires with a center-to-center separation of 0.25 inch (0.64 cm). The extrudate was passed immediately through a bath of water at room temperature, air-dried, and then irradiated to a dosage of 10 Mrad.

EXAMPLES 7-15

The ingredients shown for Examples 7-15 in Table 2 were mixed in a Banbury mixer, dumped and then granulated. The granulated materials were molded into slabs of thicknesses of 0.030" (0.076 cm) to 0.036" (0.091 cm) by compression molding at 200° C. for three minutes.

TABLE 2

| | Ex. No. | | | | | | | | | | | | | |
|---|---|---|---|---|---|---|---|---|---|---|---|---|---|---|
| Ingredients | 2C | 3C | 4 | 5 | 6 | 7C | 8 | 9 | 10 | 11 | 12C | 13C | 14 | 15 |
| Kynar 450 | 77 | | | | | 90 | | | | | 88 | | | |
| Kynar 460 | | 77 | | | | | | | | | | 89 | | |
| Solef 1010 | | | 74 | | | | 88.5 | 88 | | | | | | |
| KF 1100 | | | | 74 | | | | | 89.5 | | | | | 88.5 |
| KF 1000 | | | | | 77 | | | | | | | | | |
| Dyflor 2000M | | | | | | | | | | 89.5 | | | 88.5 | |
| Statex G | 21 | 21 | 24 | 24 | 21 | | | | | | | | | |
| Vulcan XC72 | | | | | | 8 | 9.5 | 10 | 8.5 | 8.5 | 10 | 9 | 9.5 | 9.5 |
| Omya BSH | 2 | 2 | 2 | 2 | 2 | 2 | 2 | 2 | 2 | 2 | 2 | 2 | 2 | 2 |
| Resistivity (ohm-cm) at 25° C. | | | | | | $3.1 \times 10^4$ | $1.6 \times 10^4$ | 1800 | 1850 | 2000 | 288 | 298 | 200 | 134 |

Kynar 450 is polyvinylidene fluoride available from Pennwalt and having a head-to-head content in the range 5.5 to 6.3.

Solef 1010 is a polyvinylidene fluoride available from Solvay et cie of Belgium, and having a head-to-head content of 4.1%.

KF1000 and KF1100 are polyvinylidene fluorides available from Kureha Chemical Industry Co. of Japane, and having a head-to-head content of 3.5 to 3.8%.

Statex G is a carbon black available from Cities Services Co., Columbian Division having a particle size of about 60 millimicrons, a surface area of about 32 $m^2/g$ and a DPB value of about 90 $cm^3/100$ g.

Dyflor 2000 M is a polyvinylidene fluoride available from Kay-Fries, Inc., member of Dynamit Nobel Chemikalien of Federal Republic of Germany and having a head-to-head content of about 4.4-4.9.

Vlucan XC-72 is a carbon black available from Cabot Co., having a particle size of about 30 millimicrons, a surface area of about 224 $m^2/g$ and a DBP value of about 178 $cm^3/100$ g.

TESTS FOR STABILITY IN ORGANIC SOLVENTS

The extrudates obtained in Examples 1 and 4 were compared by the following tests. Samples 2 inch (5.2 cm) long were cut from the extrudates. The samples were immersed in various solvents at 25° C. and the resistance of the samples was measured at intervals. The solvents used, and their solubiltiy parameters, were

| Solvent | Solubility Parameter $(cal/cm^3)^{0.5}$ |
|---|---|
| Toluene | 8.9 |
| Methylethylketone (MEK) | 9.3 |
| Acetone | 9.9 |
| o - dichlorobenzene | 10.0 |
| Acetic Anhydride | 10.3 |
| Pyridine | 10.7 |
| Dimethylacetamide (DMAC) | 10.8 |
| Dimethylsulphoxide (DMSO) | 12.0 |
| Dimethylformamide (DMF) | 12.1 |
| Ethanol | 12.7 |

Figure 2:
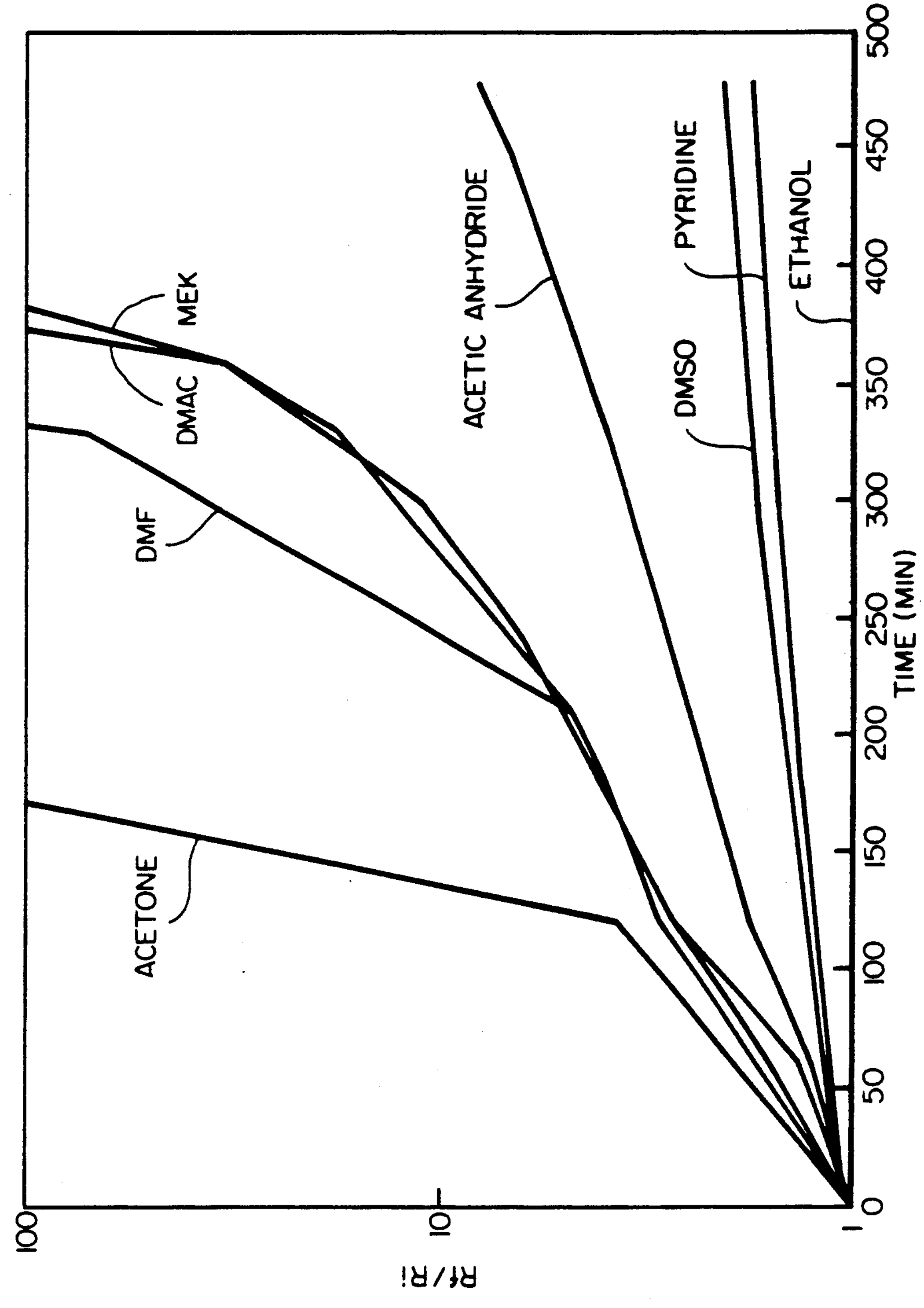

The results for Examples 1 and 4 are shown in FIGS. 1 and 2 respectively of the accompanyingd rawings, where the ratio of the resistance at a given time ($R_f$) to the initial resistance ($R_i$) is plotted against time. The greater stability of the composition of the invention (Example 4, shown in FIG. 2) is apparent.

The extrudates obtained in Examples 1 to 6 were compared in the following way. Samples 2 inches (5.1 cm) long were cut from the extrudates and were immersed in various test liquids maintined at 160° F. (71° C.). The test liquids are listed below and include diesel fuel and various commercially available additives for diesel fuel alone and mixed with diesel fuel. At intervals, the samples were removed, cooled at 25° C. and dried, and their resistance measured. Table 3 shows the value of the ratio $R_f/R_i$ for the different samples at various times. The additives tested, and their main ingredients, were as follows:

B12 Toluene, methanol, acetone, naphthalenic mineral oil and ethylene glycol monobutylether.

Fire Prep 100 Naphthalenic oil and partly oxidised aliphatic hydrocarbon

Sta-Lube Naphthalenic mineral oil

Redline and Catalyst Naphthalenic mineral oil, barium carbonate other inorganic carbonates, and sulfur-containing material Wynn's Conditioner Naphthalenic mineral oil/and isopropanol Gumout Naphthalenic mineral oil, non-aromatic ester and aliphatic acid.

Wynn's Anti-Knock Nathphalenic mineral oil, non-aromatic ester, aliphatic amide, and aliphatic acid.

FPPF Ethyl celluose, ethylene glycol monobutylether, and oxidised hydrocarbons.

TABLE 3

| Example No. | 1C(C) | 2(C) | 3(C) | 4 | 5 | 6 |
|---|---|---|---|---|---|---|
| $R_i$ (ohms) | 9.3 | 8.8 | 2.3 | 14.1 | 19.7 | 10.4 |
| $R_f/R_i$ after 19 hours in | | | | | | |
| B12 | 23 × 10$^4$ | 28 × 10$^4$ | 43 × 10$^4$ | 3.3 × 10$^4$ | 133 | 339 |
| Fire Prep 1000 | 1.02 | 1.04 | 0.96 | 0.91 | 0.94 | 0.92 |
| Sta-Lube | 1.09 | 1.04 | 1.11 | 0.94 | 0.95 | 0.91 |
| Red-line Catalyst | 1.22 | 1.06 | 1.33 | 1.00 | 0.97 | 1.05 |
| Wynn's Conditioner | 1.39 | 1.18 | 1.19 | 1.13 | 1.08 | 1.15 |
| Gumout | 1.14 | 1.10 | 1.22 | 1.01 | 1.01 | 1.08 |
| Wynn's Antiknock | 1.12 | 1.04 | 1.18 | 0.99 | 1.00 | 1.09 |
| $R_f/R_i$ after 110 hours in Diesel Fuel | 1.03 | 0.97 | 1.07 | 0.93 | 1.00 | 0.92 |
| $R_f/R_i$ after 69 hours in | | | | | | |
| Diesel Fuel + 7% B12 | 1.26 | 1.10 | 1.67 | 1.15 | 1.05 | 1.12 |
| Diesel Fuel + 7% FPPF | 1.32 | 1.12 | 1.20 | 1.08 | 1.05 | 1.12 |
| Diesel Fuel + 10% gasoline | 1.17 | 1.05 | 1.15 | 1.01 | 0.99 | 1.07 |
| $R_f/R_i$ after 275 hours in Diesel Fuel | 1.09 | 1.01 | 1.12 | 0.95 | 0.93 | 1.04 |
| $R_f/R_i$ after 157 hours in | | | | | | |
| Diesel fuel + 7% B12 | 1.66 | 1.17 | 2.97 | 1.37 | 1.08 | 1.35 |
| Diesel Fuel + 7% FPPF | 1.78 | 1.30 | 1.47 | 1.17 | 1.14 | 1.27 |
| Diesel Fuel + 10% gasoline | 1.33 | 1.10 | 1.28 | 1.06 | 1.01 | 1.16 |

RESISTANCE RELAXATION TESTS

The compositions of Examples 7–15 were tested by the following tests. Samples 1 inch (2.54 cm) by 1.5 inch (3.8 cm) were cut from the molded slabs. Electordes were formed on each sample by painting a strip 0.25 inch (0.62 cm) wide at each end with a suspension of silver particles (Electrodag 504 available from Acheson Colloids). The samples were annealed for 5 mintues at 200° C., and then cooled. The samples were then placed in an oven at 100° C. and their resistances measured at intervals. It was found that the lower the head-to-head content of the polymer, the less its change in resistance.

We claim:

1. A method of heating diesel fuel which comprises passing current through a self-regulating heater which is immersed in the diesel fuel, wherein the heater is a self-regulating heater which comprises (1) a conductive polymer element composed of a PTC conductive polymer composition comprising a particulate conductive filler dispersed in polyvinylidene fluoride which has a head-to-head content of less than 5%; and (2) at least two electrodes which are connected to a power source to cause current to pass through the conductive polymer element.

2. A method according to claim 1 wherein the heater is a strip heater.

3. A method according to claim 1 wherein the heater is a sheet heater.

4. A method according to claim 1 wherein the polyvinylidene fluoride has a head-to-head content of less than 4.5%.

5. A method according to claim 4 wherein the polyvinylidene fluoride has a head-to-head content of less than 4.0%.

6. A method according to claim 11 wherein teh aprticulate conductive filler comprises carbon black.

7. A method according to claim 6 wherein the carbon black is present at 16 to 25% by weight of the composition.

8. A method according to claim 11 wherein the composition has a resistivity of less than 200 ohm.cm.

9. A method according to claim 8 wherein the resistivity is about 10 to about 100 ohm.cm.

10. A method according to claim 1 wherein the composition is cross-linked.

11. A method according to claim 1 wherein the polyvinylidene fluoride is a homopolymer of vinylidene fluoride.

12. A method according to claim 1 wherein the composition comprises less than 35% by weight of at least one elastomeric polymer.

13. A method according to claim 1 wherein the power source is a 12 volt battery.

14. A method according to claim 1 wherein (1) the heater comprises no outer jacket and (2) the heater is in direct contact with the diesel fuel.

* * * * *

UNITED STATES PATENT AND TRADEMARK OFFICE

CERTIFICATE OF CORRECTION

PATENT NO. : 5,025,131

DATED : June 18, 1991

INVENTOR(S) : van Konynenburg et al.

It is certified that error appears in the above-identified patent and that said Letters Patent is hereby corrected as shown below:

Column 1, line 13, replace "ofe ach" by --of each--.

Column 1, line 29, replace "INterruption" by --Interruption--

Column 1, line 38, replace "813-814" by --813-815--.

Column 1, lines 48 to 49, after "(Gotcher et al.)," insert --now abandoned, 141,987 (Middleman et al.)--.

Column 1, lines 55 to 56, replace "(Copory)" by --(Sopory)--.

Column 1, line 57, replace "now U.s." by --now U.S.--.

Column 3, line 16, replace "beign" by --being--.

Column 4, line 5, after "6.0" insert --is preferred. For other uses, compositions exhibiting ZTC--.

UNITED STATES PATENT AND TRADEMARK OFFICE

CERTIFICATE OF CORRECTION

PATENT NO. : 5,025,131

DATED : June 18, 1991

INVENTOR(S) : van Konynenburg et al.

It is certified that error appears in the above-identified patent and that said Letters Patent is hereby corrected as shown below:

Column 4, line 40, replace "ino pellets" by --into pellets--.

Column 5, line 18, replace "a b 0.75 inch" by --a 0.75 inch--

Column 5, line 62, replace "DPB" by --DBP--.

Column 6, lines 19 to 20, replace "(5.2 cm)" by --(5.1 cm)--.

Column 6, line 54, replace "accompanyingd rawings," by --accompanying drawings,--.

Column 6, line 66, replace "cooled at" by --cooled to--.

Column 7, line 53, replace "Electordes" by --Electrodes--.

Col. 8, claim 6, lines 1-2, replace "claim 11 wherein teh aprticulate" by --claim 1 wherein the particulate--.

Col. 8, claim 8, line 1, replace "claim 11" by --claim 1--.

Signed and Sealed this

Third Day of August, 1993

Attest:

Michael K. Kirk

MICHAEL K. KIRK

Attesting Officer

*Acting Commissioner of Patents and Trademarks*